Patented Feb. 7, 1939

2,146,315

UNITED STATES PATENT OFFICE 2,146,315

METHOD OF MAKING WELDED FERROUS METAL ARTICLES

Gustav A. Reinbardt, Youngstown, Ohio, assignor to The Youngstown Sheet and Tube Company, Youngstown, Ohio, a corporation of Ohio No Drawing. Application February 12, 1937, Serial No. 125,426

3 Claims. (Cl. 113—112)

This invention relates to improvements in the ferrous metal art and is especially directed to the production of ferrous metal articles fabricated from metal plates, sheets, rods and/or other shapes and comprising one or more welded seams or joints.

More particularly the invention has to do with the manufacture of such articles from corrosion resistant ferrous alloys of high mechanical strength with the aid of electric arc or resistance welding or autogenous welding for making the required seams or joints.

Hitherto in the production of articles from corrosion resistant alloys, such, for example, as pipes formed from sheets or plates with a welded seam between opposed edges of the blank or steam shovel buckets or the like in which two or more separate pieces are secured together by welding, it has been found necessary to initially preheat the parts in the vicinity of the intended weld, and then, after completion of the weld, to subject the seam and adjacent parts to a further heat treatment, known as "stress relieving" treatment, in order to secure a satisfactory weld and prevent cracking or other failure resulting from internal stresses occasioned by the welding operation.

This invention therefore comprehends an improved alloy which may be fabricated into an article having a welded seam or joint without impairment of its strength, corrosion-resistance and other normal properties either in or adjacent the seam even though the welding be performed without the preheating and subsequent stress relieving treatment to which reference has been made.

While many copper-nickel alloy steels having good resistance to corrosion, strength and other desirable characteristics have been produced, so far as I am aware finished articles embodying welded seams have not been successfully made from them without these heat treatments, and I therefore believe I am the first inventor of articles of this nature particularly when made from an alloy of the composition I prefer to utilize in their manufacture as hereinafter set forth.

A principal object of the invention is, therefore, the provision of a method of making an article of copper-nickel alloy steel comprising a welded seam or joint produced without the application of heat to the article other than that incident to the actual formation of the weld per se yet in which the normal properties of the metal in the seam itself and in its vicinity are substantially the same as those of the base metal at points remote from the seam, or, in other words, in which the normal characteristics of any portion of the metal are not appreciably altered as a result of the welding operation.

Other objects, purposes and advantages of the invention will be understood or will more fully appear from the following description of an article embodying the invention and constructed in accordance therewith.

The article may be formed from alloy steel of the composition hereinafter set forth and for the production of such a steel I may use a Bessemer converter, open hearth furnace, electric furnace or the like, the constituents charged into it being controlled in the usual way to produce an alloy steel consisting principally of iron but having in addition thereto the following ingredients in the amounts stated:

|  | Percent |
| --- | --- |
| Carbon | 0.00 to 0.20 |
| Silicon | 0.10 to 0.25 |
| Copper | 0.90 to 1.10 |
| Nickel | 1.80 to 2.20 |
| Manganese | 0.35 to 0.70 |
| Iron and other elements in minute amounts | 96.85 to 95.55 |
|  | 100.00  100.00 |

Sulphur and phosphorus may be present, depending to some extent on the nature of the processes used in the manufacture of the steel and of the articles to be formed therefrom. It is desirable however that chromium, tungsten, boron, molybdenum, tantalum, uranium and vanadium be kept as low as possible as their presence in the steel in material amounts is detrimental.

The steel may, in accordance with customary practice, be first molded into ingots and these then reduced to suitable shapes for fabrication into the finished article and thus when, for example, a pipe is to be made, an elongated blank of suitable dimensions is first produced and then formed up into substantially cylindrical shape preparatory to securing its longitudinal edges together by welding. After the edges are prepared for this operation, and without preliminary heat treatment of any kind, they may be welded in accordance with any usual practice, such as electric arc or resistance welding, or they may be autogenously welded with the aid of an oxy-acetylene torch, a welding rod made of the same steel desirably being employed when the welding process requires that additional metal be supplied.

I have found that the heat conductivity and other characteristics of alloy steels within the aforesaid analysis are such that pieces thereof can be satisfactorily united by welding without preliminary heating of the metal adjacent the weld and that a stress relieving treatment is not required after its completion. That is, this steel can be welded at ordinary room as well as at very low temperatures without the addition of any preliminary heat. This is important, as at seasons of the year when sub-zero temperatures prevail, (as low as −40° F.) it is possible to accomplish welding of many articles, such as welded ship structures, which are too bulky to lend themselves to heat treatment before and after welding. This I believe to be due largely to the fact that the heat conductivity of the steel is relatively low, whereas in other steels of corresponding carbon content the heat conductivity is so high as to cause an effect in the seam similar to rapid quenching with resultant brittleness and/or cracking in and adjacent the weld if the preliminary heating and subsequent stress relieving treatment are not used. Consequently when an article is fabricated in accordance with my invention the last mentioned operations need not be employed and the completed article is of substantially uniform characteristics throughout with regard to its resistance to corrosion, strength, hardness, elasticity, yield point and other properties of the metal and not, as in most articles heretofore constructed and embodying welded seams, of different characteristics in and adjacent the latter than elsewhere.

It will be understood that while I have herein specifically mentioned an alloy steel pipe as an example of my invention, such a pipe is to be considered as merely typical of a great variety of other articles embodying welded seams and falling within its scope as defined by the appended claims, and further, that the term "seam" or "joint" as herein employed is to be deemed as including any type or form of weld by which initially separated pieces or initially separated parts of a single piece or blank are permanently united irrespective of the specific method by which the weld is produced.

Having thus described my invention, I claim and desire to protect by Letters Patent of the United States:

1. The method of producing a finished welded metal article which comprises placing in juxtaposition substantially parallel edges of parts formed of alloy steel of substantially the following analysis:

| | Percent |
|---|---|
| Carbon | 0.00 to 0.20 |
| Silicon | 0.10 to 0.25 |
| Copper | 0.90 to 1.10 |
| Nickel | 1.80 to 2.20 |
| Manganese | 0.35 to 0.70 |
| Iron and impurities | 96.85 to 95.55 | depositing in the space between said edges fused weld metal to thereby unite said edges and heat the parts adjacent thereto to a temperature materially above their temperature just prior to contact of the weld metal therewith, then dissipating to the atmosphere the heat carried by the weld metal while substantially inhibiting transmission of additional heat to the article.

2. The method of producing a finished welded metal article which comprises placing in juxtaposition substantially parallel edges of parts formed of alloy steel of substantially the following analysis:

| | Percent |
|---|---|
| Carbon | 0.00 to 0.20 |
| Silicon | 0.10 to 0.25 |
| Copper | 0.90 to 1.10 |
| Nickel | 1.80 to 2.20 |
| Manganese | 0.35 to 0.70 |
| Iron and impurities | 96.85 to 95.55 | depositing in the space between said edges fused weld metal of substantially similar analysis to thereby unite said edges and heat the parts adjacent thereto to a temperature materially above their temperature just prior to contact of the weld metal therewith, then dissipating to the atmosphere the heat carried by the weld metal while substantially inhibiting transmission of additional heat to the article.

3. In a method of producing a welded article, the steps of making an alloy steel of substantially the following analysis:

| | Percent |
|---|---|
| Carbon | 0.00 to 0.20 |
| Silicon | 0.10 to 0.25 |
| Copper | 0.90 to 1.10 |
| Nickel | 1.80 to 2.20 |
| Manganese | 0.35 to 0.70 |
| Iron and impurities | 96.85 to 95.55 | uniting initially separated edges of said steel by welding without preheating the metal in the vicinity of said edges, then cooling the metal to room temperature and inhibiting after welding the addition thereto of heat sufficient to raise it to the lower recalescence point.

GUSTAV A. REINHARDT.